US012401706B2

United States Patent
Jiang et al.

(10) Patent No.: US 12,401,706 B2
(45) Date of Patent: Aug. 26, 2025

(54) LOSS-RESILIENT REAL-TIME VIDEO STREAMING

(71) Applicant: The University of Chicago, Chicago, IL (US)

(72) Inventors: Junchen Jiang, Chicago, IL (US); Yihua Cheng, Chicago, IL (US); Ziyi Zhang, Chicago, IL (US); Hanchen Li, Chicago, IL (US)

(73) Assignee: The University of Chicago, Chicago, IL (US)

( * ) Notice: Subject to any disclaimer, the term of this patent is extended or adjusted under 35 U.S.C. 154(b) by 14 days.

(21) Appl. No.: 18/626,716

(22) Filed: Apr. 4, 2024

(65) Prior Publication Data
US 2024/0340329 A1  Oct. 10, 2024

Related U.S. Application Data

(60) Provisional application No. 63/494,619, filed on Apr. 6, 2023.

(51) Int. Cl.
*H04L 65/70* (2022.01)
*H04L 65/75* (2022.01)

(52) U.S. Cl.
CPC ............ *H04L 65/70* (2022.05); *H04L 65/762* (2022.05); *H04L 65/764* (2022.05)

(58) Field of Classification Search
CPC ...... H04L 65/70; H04L 65/762; H04L 65/764
See application file for complete search history.

(56) References Cited

U.S. PATENT DOCUMENTS

| | | | | |
|---|---|---|---|---|
| 11,544,881 | B1* | 1/2023 | Finlay | G06N 3/08 |
| 2023/0017778 | A1* | 1/2023 | Sinha | G06N 3/0442 |
| 2023/0161621 | A1* | 5/2023 | Abts | G06F 15/163 |
| | | | | 709/224 |
| 2024/0048724 | A1* | 2/2024 | Qu | H04N 19/157 |
| 2024/0168915 | A1* | 5/2024 | Du | G06F 15/825 |
| 2024/0289590 | A1* | 8/2024 | Cricrì | G06N 3/084 |
| 2024/0340329 | A1* | 10/2024 | Jiang | H04L 65/70 |
| 2024/0380929 | A1* | 11/2024 | Begaint | H04N 19/91 |

OTHER PUBLICATIONS

Wu et al. "Energy-Efficient and Robust Tensor-Encoder for Wireless Camera Networks in Internet of Things" IEEE Transactions On Network Science and Engineering, vol. 6, No. 4, Oct.-Dec. 2019, pp. 646-656 ( Year: 2019).*
Li et al., "Reparo: Loss-Resilient Generative Codec for Video Conferencing," retrieved from https://arxiv.org/abs/2305.14135, dated May 23, 2023, 17 pages.

\* cited by examiner

*Primary Examiner* — David R Lazaro
(74) *Attorney, Agent, or Firm* — Erik A. Huestis; Alexander Akhiezer; Foley Hoag LLP

(57) ABSTRACT

Systems, methods, and computer program products are provided for streaming video over a network. In various embodiments, a source video including at least a source frame is read. The source frame is encoded into a corresponding tensor representation by a machine learning model. The corresponding tensor representation is decomposed into a plurality of sub-tensors. Each of the plurality of sub-tensors is encoded into a corresponding packet and transmitted via a network from a source node to a receiver node.

20 Claims, 11 Drawing Sheets

LOSS-RESILIENT REAL-TIME VIDEO STREAMING

CROSS-REFERENCE TO RELATED APPLICATIONS

This application claims the benefit of U.S. Provisional Application No. 63/494,619, filed Apr. 6, 2023, which is hereby incorporated by reference in its entirety.

BACKGROUND

Embodiments of the present disclosure relate to video streaming, and more particularly to loss-resilient real-time video streaming protocols.

BRIEF SUMMARY

According to embodiments of the present disclosure, methods and computer program products for video streaming over a network are provided. In various embodiments, a source video including at least a source frame is read. The source frame is encoded into a corresponding tensor representation by a machine learning model. The corresponding tensor representation is decomposed into a plurality of sub-tensors. Each of the plurality of sub-tensors is encoded into a corresponding packet and transmitted via a network from a source node to a receiver node.

In various embodiments, encoding the source frame includes determining an I-frame corresponding to the source frame. In various embodiments, encoding the source frame includes determining a P-frame corresponding to the source frame. In various embodiments, encoding the source frame includes determining a composite frame comprising at least two regions, the first region encoded as a P-frame and the second region encoded as an I-frame.

In various embodiments, a second source frame is encoded by determining a composite frame that includes a third region, which is different than the second region, and where the third region is encoded as an I-frame.

In various embodiments, the machine learning model includes an artificial neural network. In various embodiments, encoding each of the plurality of source frames into its corresponding tensor representation includes applying an autoencoder.

In various embodiments, decomposing the tensor representation includes randomly selecting the plurality of sub-tensors. In various embodiments, encoding each of the plurality of sub-tensors includes applying entropy encoding.

In various embodiments, at least some of the packets are received via the network at the receiver node. In various embodiments, decoding the received packets includes obtaining at least some of the plurality of sub-tensors. At least some of the plurality of sub-tensors are combined to form a playback tensor. The playback tensor is then decoded to determine a playback frame.

In various embodiments, decoding the received packets includes applying entropy encoding.

In various embodiments, decoding the playback tensor includes applying an artificial neural network.

In various embodiments, decoding the playback tensor includes applying an autoencoder.

In various embodiments, the playback frame includes a P-frame, an I-frame, or a composite thereof.

In various embodiments, at least one of the plurality of sub-tensors is not obtained. In such embodiments, the playback tensor includes zero-values in place of the at least one of the plurality of sub-tensors that were not obtained.

In various embodiments, an indication of the plurality of sub-tensors that were not obtained is sent from the receiver node to the source node. In response to the said indication, the playback frame at the source node is determined. A resynchronized frame is determined that is configured to correct the omission of the sub-tensors that were not obtained and transmitted from the source node to the receiver node.

In various embodiments, a plurality of packets is received via a network from a source node where each of the plurality of packets includes an encoded sub-tensor of a tensor. Each of the plurality of packets is decoded thereby obtaining a plurality of sub-tensors of the tensor. The plurality of sub-tensors are combined to form a playback tensor that is then decoded to determine a playback frame.

DETAILED DESCRIPTION

Figure 1:
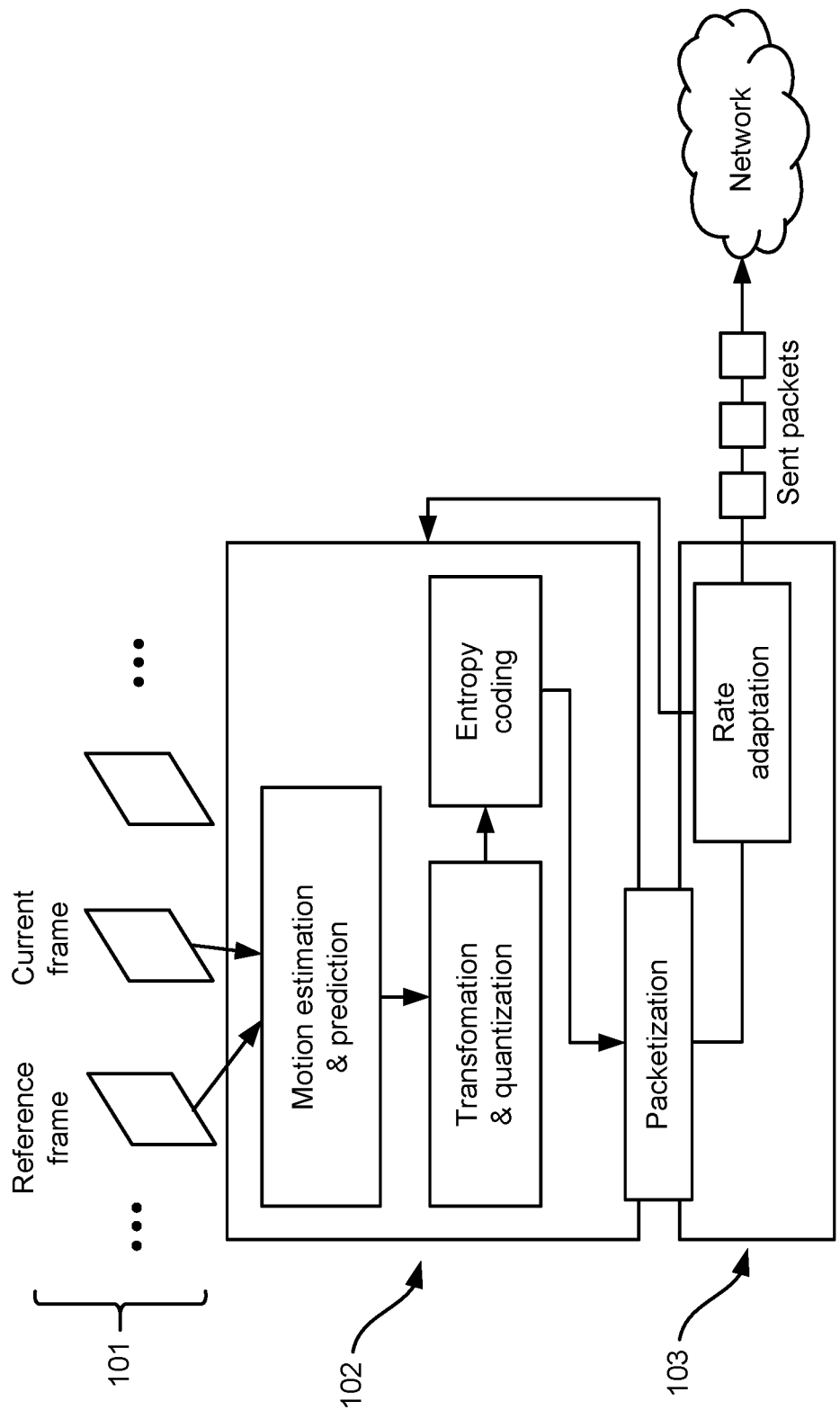
FIG. 1 is schematic view of an exemplary video encoder workflow according to embodiments of the present disclosure.

Real-time video communication has a long history in research, yet only recently has it become truly widespread in our daily lives from online meetings, cloud gaming, to interactive virtual reality and IoT applications. The amount of time spent on real-time videos is growing at a much faster rate than the time spent on streaming videos, whether live and on-demand. However, users of real-time video applications (e.g., video calls and online gaming) are more susceptible to poor quality and video stuttering compared to those who stream and watch on-demand videos.

Despite intensive research towards better congestion control and bitrate adaptation for videos available over the Internet, packet jitters and retransmission are still difficult to eliminate, especially in long-latency links and bandwidth fluctuations, such as long-distance video calls. The retransmission of packets may not be concealed by a short buffer (e.g., merely 10 ms in WebRTC), which allows frames to be played as soon as they are decoded. As a result, the extra delay to wait or resend a single packet frame, which could take 100 s ms or longer in long-latency links, can block the decoding of multiple frames and cause a visual stuttering.

Therefore, loss-resilient video coding is crucial for high-quality, smooth real-time videos. Ideally, it should have high compression efficiency, which means high quality with fewer bits, and loss resilience under various data missing rate or DMR defined by the fraction of data that is not received, due to packet drops or queuing, before a frame is decoded.

Unfortunately, current real-time video systems achieve loss resilience by adding various forms of redundancies, thus sacrificing compression efficiency. To handle 30% DMR, for instance, forward error correction (FEC) must add (at least) 30% redundancy before transmission. For this reason, most systems only increase FEC redundancy after packet loss has already affected some frames, which requires packets to be resent until enough packets are received.

Even after the packet loss has subsided, FEC may still add too much redundancy, thereby reducing video quality. Similarly, loss resilience could be achieved by using an older but reliably received frame as the reference frame, allowing the decoder to safely skip a loss-affected frame. However, using an old reference frame means more bits to achieve the same quality as using the last frame as reference, which lowers compression efficiency.

Various autoencoders (employing artificial neural networks) may be used to generate an encoded tensor for video data such as individual frames. Such autoencoders are known in the art, and may be used in place of more conventional video data encoders. More generally, various additional machine learning models may be used to generate encoded tensors. Examples include deep neural networks (DNNs), which may be configured as Generative Adversarial Networks (GANs) or trained using more conventional methods. Alternative Artificial Neural Networks (ANNs) include feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

Referring to FIG. 1, an exemplary video encoder workflow is illustrated. A plurality of frames 101 is provided from a video source to an encoder 102. As discussed further below, a given encoding step may refer to a current frame relative to one or more reference frame prior to the current frame. A current frame is motion estimate and prediction, transformation and quantization, and entropy coding. The resulting encoded frame or frames is then packetized in a platform specific manner (e.g., to meet the MTU of a given network). The resulting packets are transmitted via a network to one or more receiver. Feedback from the network layer may be employed to provide rate adaptation, adjusting parameters of the encoder in order to meet throughput limitations of a given network.

A video stream consists of multiple groups of consecutive frames (called group of pictures or GoP), each starting with an I-frame (intra-frame) followed by P-frames (predicted frames) and B-frames (bidirectional predicted frames). I-frames are encoded independently (i.e., they can be decoded without referring to other frames), so their sizes are often much bigger than P-frames, which only encode the differences between themselves and other reference frames.

To encode a P-frame, the encoder first calculates motion vectors (MVs) and residuals of each macroblock or MB (each of 4×4, 8×8 . . . ) in the current frame, then transforms and quantizes them to a more compact form, and finally, entropy encodes the data. The entropy-encoded data is then packetized and sent out by the transport layer, which tries to deliver as many packets as possible to the receiver by the time when the frame is decoded. Similarly, the receiver depacketizes and decodes the received data to reconstruct each frame from received packets. A decoded frame is put in a buffer before playing to conceal transient latency jitters.

To reduce frame delay under long latency, real-time video clients make two common choices:
  a. Packets of a frame are sent in a burst (without waiting for acks), so any packets in the middle of a frame could be missing (delayed or dropped) when the receiver tries to decode the frame.
  b. The buffer is much shorter (e.g., 10 s ms) than that of on-demand or live broadcast videos (whose buffer is at least a few seconds). Thus, retransmission delay often cannot be concealed, particularly in long-latency networks.

Therefore, loss resilience is vital for real-time video coding.

Data-missing rate (DMR) is defined as the fraction of packets of a frame that have not arrived when the frame is decoded. A missing packet can be due to queuing or retransmission. High DMRs arise from various reasons. For instance, a sudden bandwidth drop from 3 Mbps to 500 Kbps on a 200 ms-RTT link can quickly raise DMR to 75% and retransmission will delay or skip at least 6 frames in a 25 fps video stream. Previous measurements have shown that transient high DMRs (e.g., >30%) are not rare and are difficult to precisely predict in advance. Note that our work does not assume that high DMRs are persistent in presence of a rate adaptation logic.

In a desirable video coding, quality should gracefully degrade in presence of more packet loss, without compromising the quality in absence of packet loss. This can be attributed to three specific requirements:
  a. (R1) The receiver can decode a frame if any non-empty subset of the packets of this frame is received—minimum need for retransmission or frame skipping.
  b. (R2) The quality should gradually improve with the addition of any received packet—graceful degradation with higher DMRs.
  c. (R3) If all packets are received, the decoded video will reach a quality close to that of a non-loss-resilient coding algorithm (such as H.265)—high compression efficiency.

Figure 2:
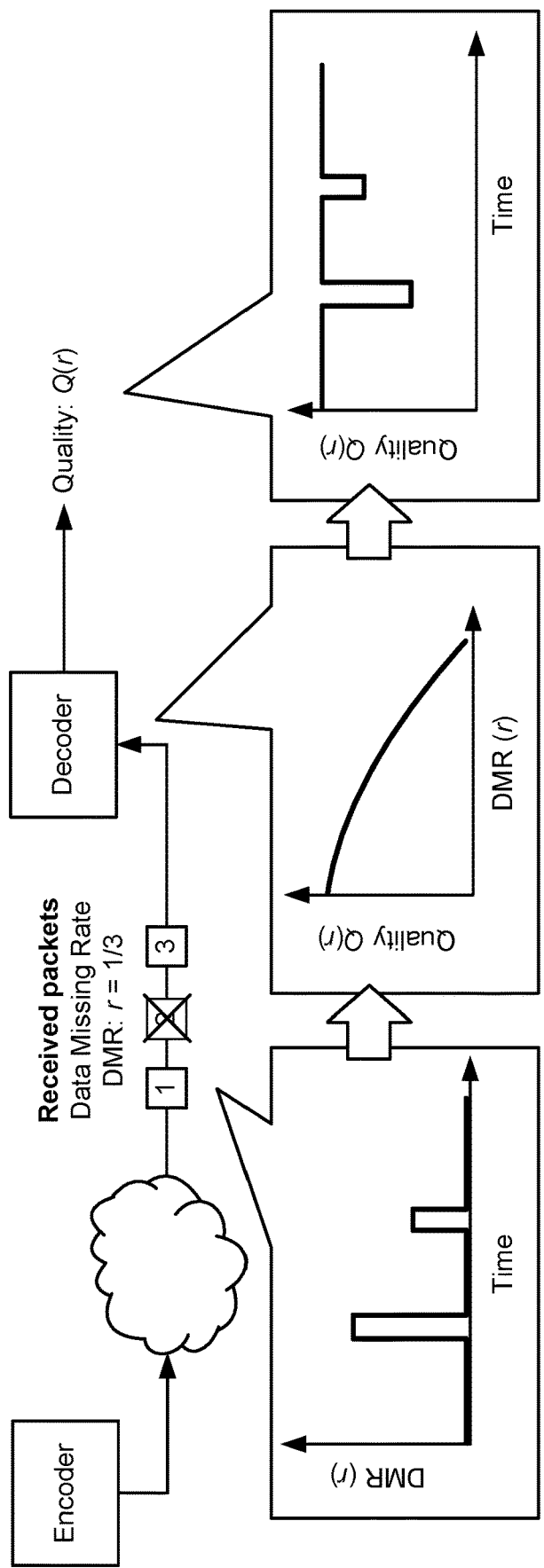
FIG. 2 is a schematic view of a video streaming system with accompanying graphs illustrating quality metrics according to embodiments of the present disclosure.

FIG. 2 illustrates desirable quality metrics as packets are lost. In this example, it is assumed that bandwidth is mostly stable with intermittent high-DMR spikes caused by transient bandwidth drops and that the encoding bitrate matches the actual bandwidth. As DMR varies over time, the quality of decoded frames likewise varies, at high DMR quality is low (zero) and drops gracefully when DMR increases.

Some streaming video systems rely on congestion control and bitrate adaptation logics to react to bandwidth fluctuation and rely on TCP to retransmit lost packets. They use highly efficient codec (e.g., H265), so if all packets are received on time (i.e., retransmission is fast enough), they will reach a high quality with fewer bits. However, it violates R1 because these codecs are not inherently loss tolerant, so a frame cannot be decoded until all packets are received.

Scalable video coding (SVC) tries to optimize the classic notion of rate-distortion (RD) tradeoff, which represents video quality achieved by a single encoded bitstream under different received bitrates. SVC encodes a video at multiple quality layers and sends data layer by layer, so that each newly received packet (or layer) will incrementally improve quality. SVC-based techniques have made progress towards RD-optimized quality in on-demand video streaming, e.g., fine-grained scalability (FSG) and more recently, DeepFSG and Swift.

However, SVC does not meet R2, because it imposes a hierarchical order among the packets of a frame; one missing packet can affect all higher quality layers, even if more packets are received in the higher quality layers. Although sending each layer reliably one by one is possible in on-demand videos, real time video clients send each frame as one burst to reduce frame delay, so packet loss can affect any layer. As a result, SVC is rarely used to improve unicast real-time video (though it is used widely by multicast videos to serve users with heterogeneous network capacities). Essentially, DS coding differs from RD optimization on a key aspect—the quality of DS coding depends on how many packets, not which packets, are received.

The most common loss-resilient coding in real-time video is forward error correction (FEC). Given a target frame size RR, FEC encodes frames at N. The frame will be decodable, once any NFEC differs from SVC in that SVC depends on which data is received, whereas FEC depends on how much data is received. However, FEC-based schemes, including rateless coding and streaming code, must know in advance how much data will arrive before the receiver decodes a frame or else it will add either too much redundancy or still need to retransmit. If redundancy is not enough to conceal missing packets in time (i.e., DMR is underestimated), some packets must be waited or retransmitted in order to decode the frame, which violates R1. Once the received packets are decodable, more packets will not improve the quality, which violates R2 and if all packets are received (i.e., DMR is overestimated), the redundancy will lower the video quality, which violates R3.

Besides FEC which adds redundancy to the video encoder output, the video coding itself can increase loss resilience. For instance, using an older but reliably received frame, instead of the last frame, as the reference frame, the decoder can safely skip a loss-affected frame without hurting subsequent frames. However, this method also needs more bits to encode the same quality than using the last frame (which has a much smaller difference with the current from) as the reference frame (e.g., the P-frames between every other frames are 40% greater in size than between two consecutive frames). Without redundancy in coded data, one can still choose to skip a loss-affected frame, if skipping does not affect future quality. It works well for on-demand videos where (1) B-frames can be safely skipped, (2) the impact of a skipped frame will stop at the next chunk within a few seconds, and (3) the content is known in advance to profile the impact of skipping each frame on future frames. Unfortunately, none of them apply to real-time videos.

Error concealment by the video receiver has been studied in multimedia including recent work that uses neural networks (NN) to recover lost motion vectors (MVs) or use inpainting techniques to recover lost residuals. The key problem of these error concealment strategies is two-fold. First, more macroblocks (MBs) need to be set in INTRA mode (independently decodable) and neighboring MBs should ideally be in different packets to facilitate recovery during packet losses. However, all of these increase the frame size (e.g., 30% for four packets) and this inflation increases with more packets, since they fail to leverage similarity among MBs-they do not meet R3. Second, since the sender still uses a standard codec, there is minimum redundancy in the encoded motion vectors and residuals, and thus the motion vector recovery or inpainting tasks are inherently "underspecified." As a result, their quality degrades quickly with higher DMRs.

Figure 3:
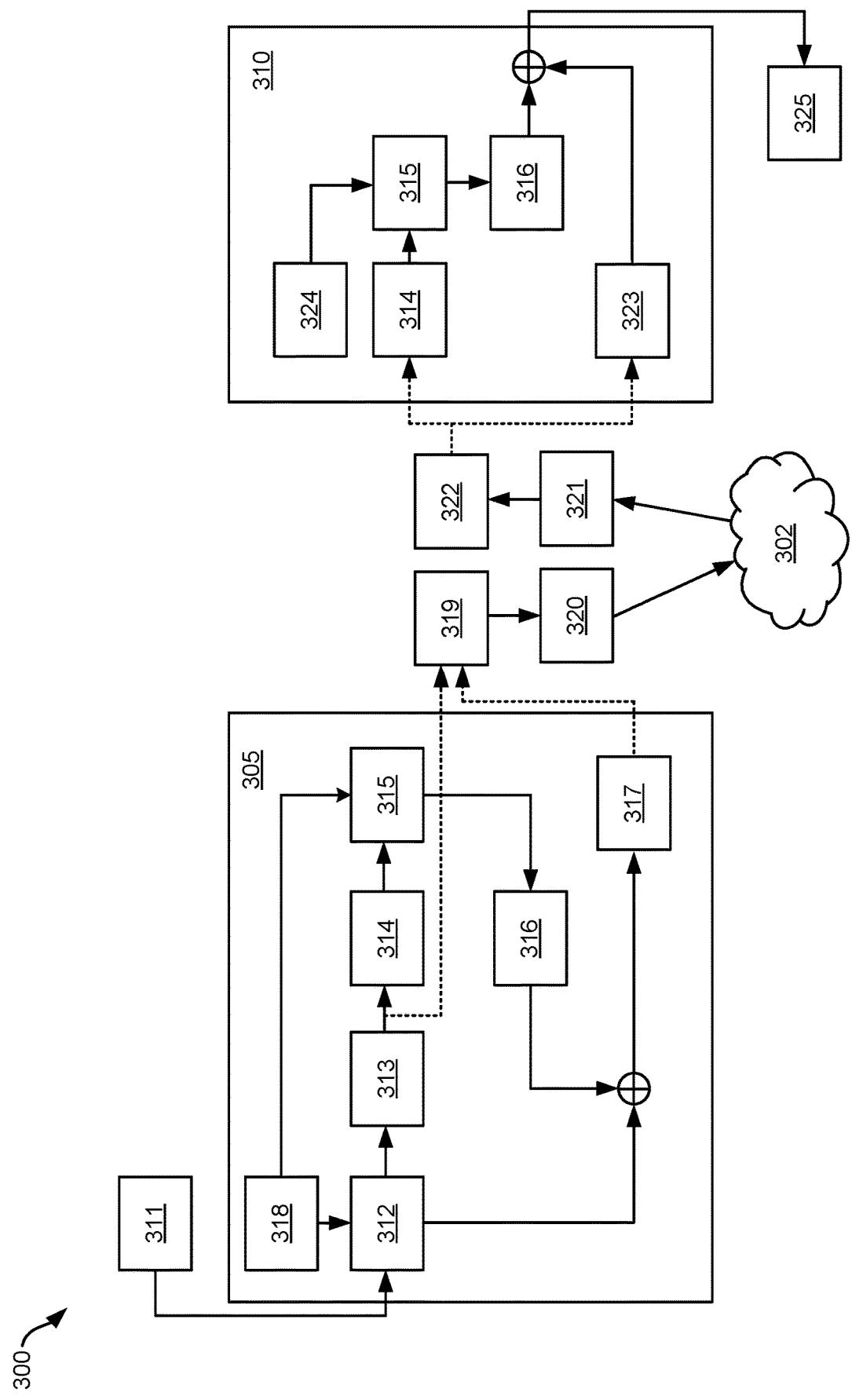
FIG. 3 is a block diagram of an exemplary encoder-decoder system according to embodiments of the present disclosure.

Referring now to FIG. 3, a block diagram is provided of an exemplary video encoder-decoder system 300. System 300 includes a sender 305 and a receiver 310. In general, sender 305 encodes video data via one or more encoders and transmits the encoded video data to a receiver 310 via a network 302, such as the Internet. Receiver 110 decodes the encoded video data upon receipt using one or more decoders. To encode a current video frame 311, sender 105 uses a motion estimator 312 to compute the displacement between the current frame 311 and a stored past frame 318 that is used as the reference. Usually, the immediate past frame is considered to be the reference. The displacement is generally in the form of motion vectors, two-dimensional vectors that provide an offset in the coordinates of the current video frame 311 with reference to the coordinates in a reference past frame 318.

In some embodiments, sender 305 further includes a motion vector encoder 313 that compresses the motion vector by generating a compressed representation of the motion vectors. The compressed motion vectors are further processed using a motion vector decoder 314 and motion compensator 315 to produce a frame prediction 316 giving a predicted current video frame. Frame prediction 316 is compared to current video frame 311 to generate a residual. This residual generally represents the difference between the predicted video frame and the current video frame 311. The residual is encoded by residual encoder 317 and combined with encoded motion vectors to form a coded tensor 319. Tensor 319 is further encoded using an entropy encoder and packetizer 320. Entropy encoder and packetizer 320 splits the coded tensor 319 into sub-tensors and encodes each of the sub-tensors into a respective entropy encoded format. In some embodiments, the entropy encoded format of the sub-tensors is more memory efficient than the respective sub-tensors. A data packet is generated for each entropy encoded sub-tensor and transmitted to receiver 310 over network 302.

In some embodiments, receiver 310 includes a depacketizer and entropy decoder 321 that collects data packets received from the network 302. After receiving the data packets, depacketizer and entropy decoder 321 decodes the entropy encoded sub-tensors to generate predicted sub-tensors. After generating the predicted sub-tensors, the depacketizer and entropy decoder 321 combines the predicted sub-tensors to generate a predicted coded tensor 322. In some embodiments, if one or more data packets carrying a respective entropy encoded sub-tensors are missing, the depacketizer and entropy decoder 321 fills the values of the missing elements of the predicted coded tensor 322 by a zero value (whether an actual zero or a format-specific default value). In some embodiments, the mask value can be established by sender 305 via prior communication with the receiver 310 or by a shared video format. In some embodiments, sender 305 updates the receiver 310 with mask values at regular time intervals while transmitting data packets to the receiver 310.

In some embodiments, the receiver 310 processes the predicted coded tensor 322 and one or more prior decoded frames 324 using motion vector decoder 314 and motion compensator 315 to arrive at a frame prediction 316. The receiver 310 also uses a residual decoder 323 to generate predicted residuals which is an estimate of the difference between the predicted video frame the video frame 311. The receiver 310 then uses the predicted residuals and the frame prediction 316 to generate a decoded frame 325.

In some embodiments, motion vector encoder 313 and the motion vector decoder 314 are autoencoder-based. Similarly, residual encoder 317, residual decoder 323, entropy encoder, and/or entropy decoder may be auto-encoder based.

In general, autoencoders use learned neural networks (NNs), instead of handcrafted logics, to encode and decode video frames. The encoder is denoted by $f\phi$ (with its NN weights $\phi$) and the decoder by $g_\theta$ (with its NN weights $\theta$). The encoder encodes a frame x to a coded tensor $y=f_\phi(x)$, and the decoder decodes y to a reconstructed frame $\hat{x}=g_\theta(y)$. Traditionally, autoencoder training minimizes the expectation (i.e., training loss function) given in Equation 1, where $y=f_\phi(x)$.

$$\mathbb{E}_x Err(g_\theta(y), x) + \alpha \cdot Size(y) \qquad \text{Equation 1}$$

Here, Err $(\hat{x},x)$ is the pixel-level reconstruction error of the decoded frame $\hat{x}$ (by default, L2-norm3 of $\hat{x}-x$), and Size (y) is the entropy-coded data size of y in bit-per-pixel (BPP). The parameter $\alpha$ influences the size/quality tradeoff: a higher $\alpha$ leads to smaller frame size (Size $(\hat{x})$) but higher distortion (i.e., poorer quality) of the reconstructed frame $\hat{x}$.

Since all of the functions—, $g\theta$, Err and Size are differentiable, the NN weights $\phi$ and $\theta$ can be trained jointly to minimize Equation 1. It is comprised of steps (e.g., motion and residual estimation) typically found in a traditional video codec but uses NNs to replace hand-crafted heuristics for motion estimation, compensation, and transformation of residual and motion vectors. Since they are trained on large sets of videos (e.g., Vimeo-90K), their compression efficiency is comparable to recent video codes and is reasonably generalizable across a variety of video content. For these reasons, autoencoders attract increasing attention from the multimedia community.

Currently autoencoders still use traditional schemes (like FEC) to handle packet loss. Their lack of packet loss tolerance is due to several reasons, including that entropy encoding used in autoencoders compresses the whole encoder output as a single bitstream, so any data loss will render it undecodable.

To address the shortcomings of alternative approached, in various embodiments of the present disclosure, a video encoder such as an autoencoder uses a customized video streaming framework to deliver encoded video data. A new packetization scheme with per-packet entropy encoding is employed, which makes packet loss of n % DMR appear to have the same effect as n % random making on the coded tensor.

In some embodiments, the elements in an encoded tensor are randomly split into smaller sub-tensors and then each sub-tensor is entropy encoded separately as an independently decodable packet. If a packet is missing, its elements in the original coded tensor is set to zeros. This scheme ensures that losing any packet appears to be uniform random masking on the coded tensor. This further explained with reference to FIG. 4.

Figure 4:
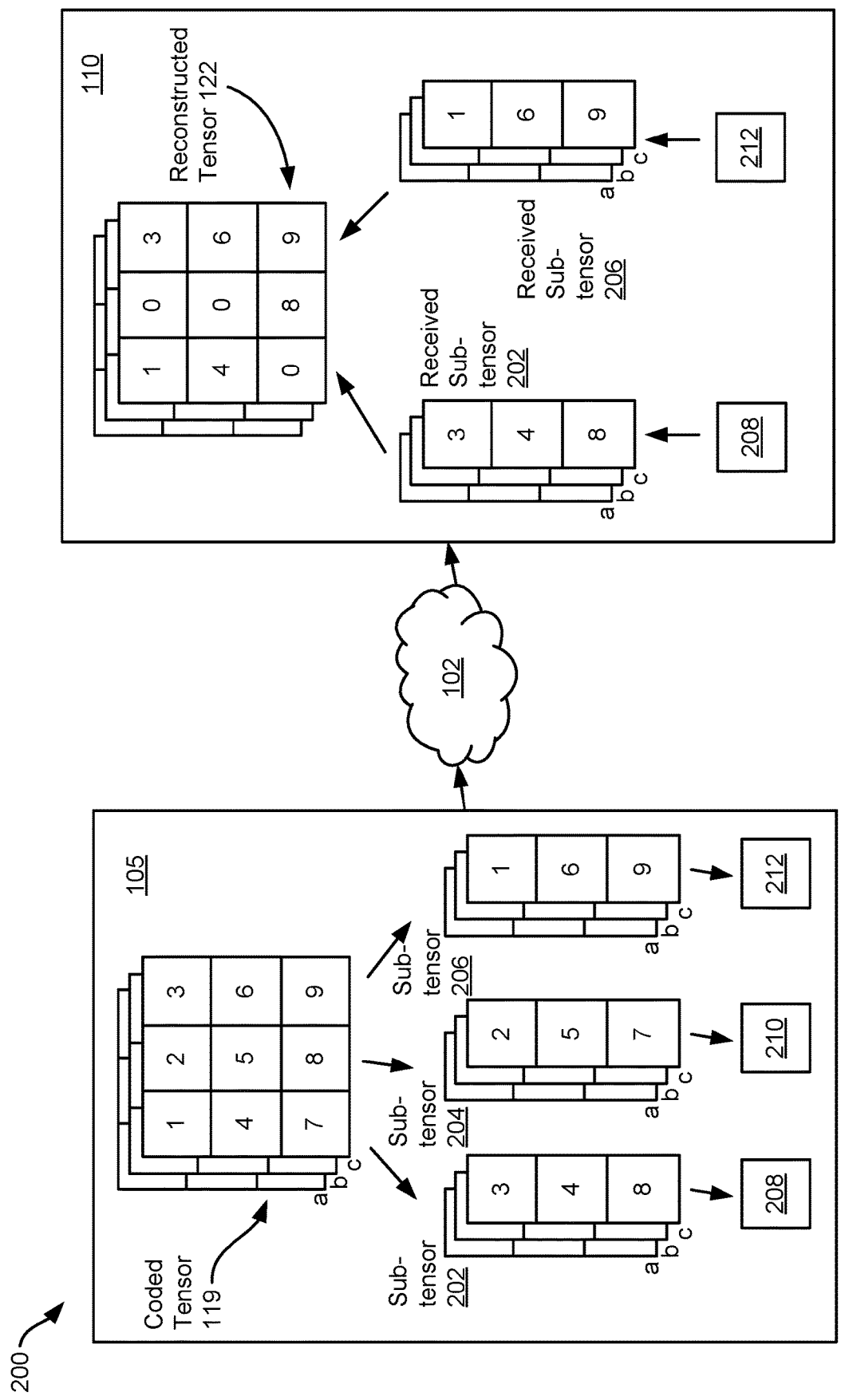
FIG. 4 is a block diagram illustrating packetization and per packet entropy encoding according to embodiments of the present disclosure.

FIG. 4 is a block diagram illustrating packetization and per packet entropy encoding according to embodiments of the present disclosure. At left, FIG. 4 shows the packetization and per packet entropy encoding of the coded tensor 419 by the sender 405. The coded tensor 419 includes three channels a, b, and c. As a first step of the packetization and per packet entropy encoding, the coded tensor 419 is partitioned into sub-tensors 402, 404 and 406 by selecting elements of the coded tensor 419 at random. For example, sub-tensor 402 includes elements 3, 4 and 8 of the coded tensor 319. The sub-tensor 404 includes elements 2, 5, and 7 of the coded tensor 319. The sub-tensor 406 includes elements 1, 6, and 9 of the coded tensor 419. Each of the sub-tensors 402, 404 and 406 are partitioned across channels a, b and c.

In some embodiments, the sub-tensors 402, 404 and 406 are encoded using the entropy encoder to generate entropy-encoded sub-tensors 408, 410 and 412 respectively. For example, the sub-tensor 402 is entropy-encoded to 408.

In some embodiments, the size of the entropy encoded sub-tensors 408, 410 and 412 is less than or equal to the payload capacity of data packets allowed by the network 302. The entropy encoder and packetizer 320 includes each of the entropy-encoded sub-tensors 408, 410 and 412 as payload to a respective data packet and transmits the data packets to the receiver 310.

In some embodiments, the receiver 310, after receiving the data packets from the sender 305, retrieves the entropy-encoded sub-tensors that were included in the data packets. For example, receiver 310 retrieves the entropy-encoded sub-tensors 408 and 412. As illustrated, packets are sometimes lost in transit over network 302. Receiver 310 uses an entropy decoder to decode each of the received entropy encoded sub-tensors to generate a respective decoded sub-tensor. The decoded sub-tensors are then combined together to form a tensor for decoding and playback.

As shown, if there is a loss of data packets, the decoder of the receiver 310 only receives a subset of the entropy encoded sub-tensors. For example, assume that the data packet carrying the entropy encoded sub-tensor 410 is lost in transmission. In such a scenario, receiver 310 receives data packets carrying entropy encoded sub-tensors 408 and 412. In such situations, receiver 310 uses the entropy decoder of the depacketizer and entropy decoder 321 to decode entropy encoded sub-tensors 408 and 412 to generate predicted sub-tensors 402 and 406. Receiver 310 then combines the predicted sub-tensors 402 and 406 to generate a tensor 322 by substituting a zero value (e.g., an actual zero or another format-specific value) for the values of the elements that were missing due to the packet loss. For example, the value of the elements 2, 5 and 7 of the coded tensor 319 were replaced by zero in tensor 322.

In some embodiments, entropy encoding on a per-packet basis may increase the size of packets compared to the entropy encoding used in traditional autoencoders. The reason for the increase is that entropy coding needs to store the symbol distribution of elements in the sub-tensors in order to compress it efficiently. For example, when the whole coded tensor is compressed together, the additional overhead of symbol distribution will be marginal (5-20% of the compressed data). However, with the per-packet entropy coding, the symbol distribution needs to be included in each data packet to make any received packet decodable, which may increase the size of the total data.

In some embodiments, in order to reduce the size of the total data transmitted from the encoder to receiver 310, only the variance (a single float) is used to describe the symbol distribution in each channel of a coded tensor. Such coarse-grained symbol distribution needs fewer bits to store than the per-packet entropy encoding. For example, if there are 20 data packets, adding the symbol distribution to each packet only increase the total data size by no more than 5%. This approach leverages the fact that certain encoders, such as autoencoders, regularize the distribution of elements in each channel of a coded tensor to follow a Laplace distribution with a mean of zero (allowing the variance to accurately reconstruct the distribution at the receiver side). It will be appreciated that a similar approach may be taken with alternative distributions.

In some embodiments, the encoder encodes a new frame with a fixed interval (by default, 40 ms or 25 fps). The decoder will try to decode a frame when the first packet of the next frame is received. If no packet of the current frame is received, then it will request the encoder to send the frame again. Otherwise, if at least one packet of the current frame is received, then it will decode the frame.

Generally, if a reference frame is decoded using a subset of packets, the state will be "out-of-sync" between the encoder and decoder, the reference image used to encode the next frame is different from the reference used by the decoder. This is further explained with reference to FIG. 5.

Figure 5:
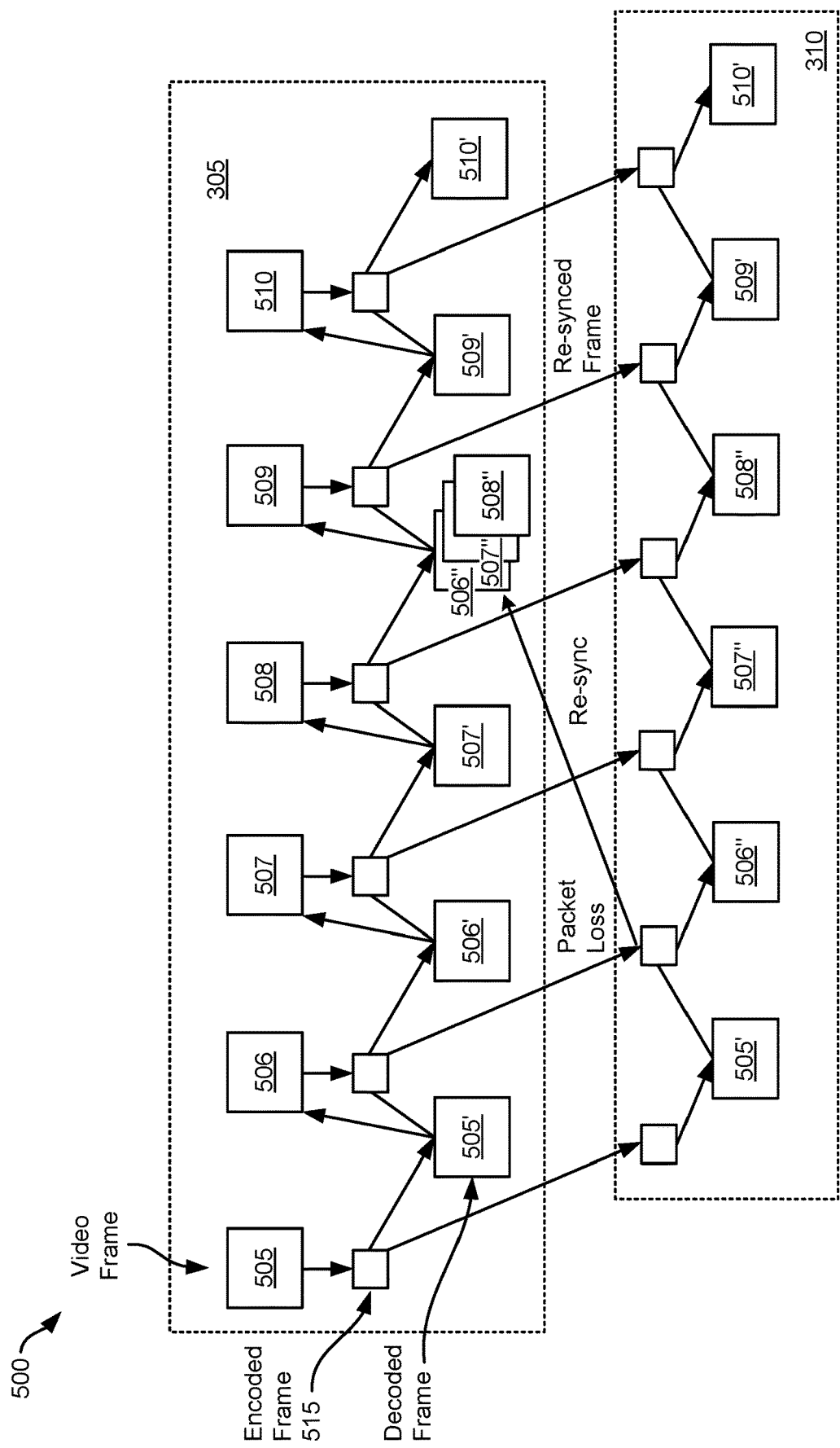
FIG. 5 is a block diagram illustrating state synchronization between an encoder and decoder according to embodiments of the present disclosure.

FIG. 5 is a block diagram illustrating packet loss and state synchronization between sender 305 and receiver 310. In FIG. 5, sender 305 generates an encoded frame 515 of video frame 505. Encoded frame 515 is then transmitted to the decoder of receiver 510. Transmission of the encoded frame to the receiver 310 adheres to the methods explained with reference to FIG. 4. Sender 305 then decodes the encoded frame 515 to generate a decoded frame 505'. Sender 305 also decodes encoded frame 515 to determine decoded frame 505'. Sender 305 uses its copy of decoded frame 505' to encode the subsequent original 506. The process of encoding video frames continues at the sender 305, for frames 505 . . . 510.

When the decoder of the receiver 310 receives all of the sent packets, it is able to reconstruct a complete tensor and thus the result of decoding at the received side matches the result of decoding at the sender side (e.g., frame 505'). However, where there is packet loss during transmission of the encoded frame, the reconstructed tensor has zero values as discussed above, and the result of decoding at the receiver side does not match expectation. For example, the sender expects decoded frame 506', but the receiver generates decoded frame 506". This drift is compounded for subsequent frames, as p-frames are applied to incorrect priors. In this example, this results in the receiver arriving at frames 507" and 508" instead of 507' and 508'. Thus, even if all packets of video frame 507 are received, its quality will be compromised.

To address this loss of synchronization, sender 305 and receiver 310 can synchronize the reference frame on each frame. However, this would significantly inflate the delay as the sender 105 has to wait for the feedback from the receiver 310 (at least an RTT) after each frame.

In some embodiments, selective state resynchronization requests are employed. In such embodiments, receiver 310 transmits a resynchronization request to sender 305 when the receiver 310 decodes a frame using a subset of data packets (e.g., due to packet delay or loss). In such embodiments, when sender 305 receives the resynchronization request, it quickly re-decodes the recent frames to reconstruct the same reference frame (506", 507", 508") generated by the receiver 310. For instance, as pictured, sender 305 is about to encode video frame 509 when it receives a resynchronization request indicating that video frame 506 was decoded with a subset of data packets, resulting in 506" instead of 506'. In response, sender 305 generates video frames 506", 507", 508", which it then uses to create a new reference for encoding of frame 509. Receiver 310 can then compute a resynchronized frame 509' without receiving a complete new reference frame.

A potential speed bottleneck is re-decoding reference frames (from frames 506 . . . 508) during re-sync. Fortunately, re-synchronization does not have to have the highest quality, which allows skipping autoencoder decoding (in embodiments using an autoencoder), by skipping the frame prediction NN. Similar simplifications may be made in other decoder implementations. Skipping frame prediction allows decoding more quickly, and thus it will not add much new overhead.

In general, the quality of P-frames will gradually degrade after an I-frame. One way to avoid degradation is to add I-frames frequently (say every 10 frames), which strikes a better tradeoff between quality and average bitrate. However, since I-frames have bigger sizes than the P-frames, adding them frequently will create frequent spikes of frame size making it difficult for congestion control to efficiently utilize network capacity at a fixed interval.

Figure 6:
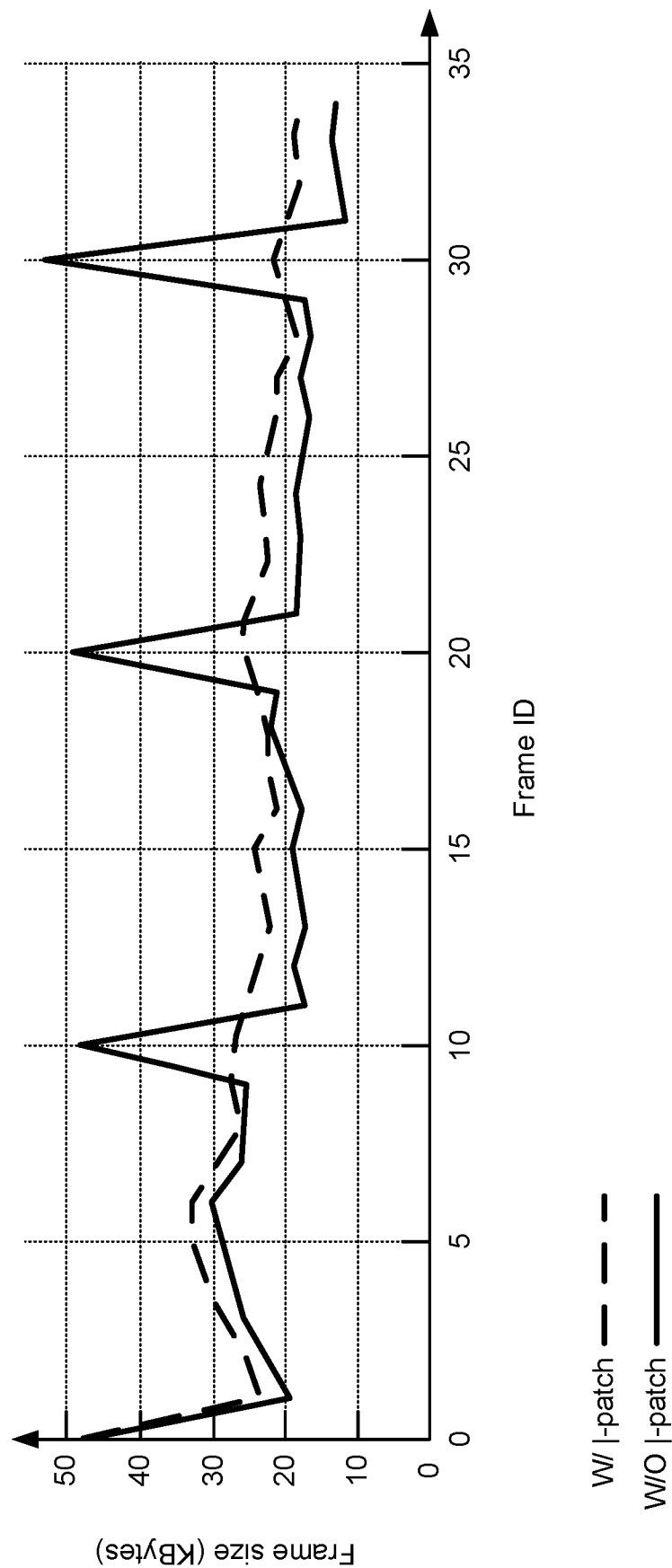
FIG. 6 is a graph illustrating the frame size impact of composite frames according to embodiments of the present disclosure.

In some embodiments, to avoid intermittent frame size spikes due to I-frame transmission, a small patch of each frame is encoded as an I-frame rather than a P-frame (while the remainder of the frame is encoded as a P-frame). This patch may be referred to as an I-patch, and allows the overhead of a complete I-frame to be spread out over multiple frames. This is illustrated in FIG. 6, showing that by including I-patches, frame size spikes may be minimized. In exemplary embodiments, the I-patches replace I-frames entirely. In other exemplary embodiments, periodic I-frames are still delivered alongside I-patches. An exemplary I-patch may have a pixel size of 128×128 to 512×512. For each frame, the pixels outside the small patch are encoded as a P-frame. In some embodiments, the location of the small patch on a frame changes over time, resulting in scanning the whole frame size every k frames. In practice, when k is between 10 and 15, the compression efficiency is roughly the same.

Figure 7A:
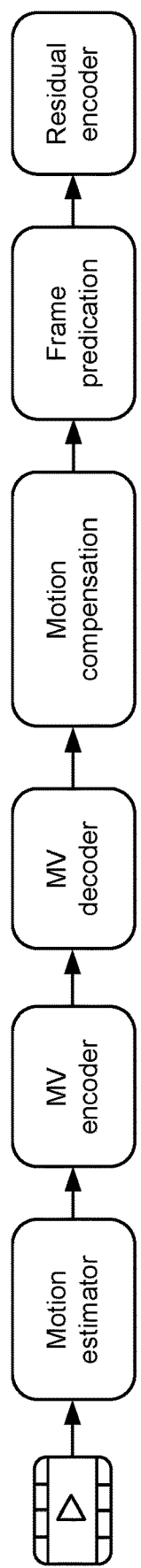
FIGS. 7A-C are block diagrams illustrating autoencoder pipeline improvements according to embodiments of the present disclosure.

Referring now to FIG. 7, autoencoder pipeline improvements are illustrated, enabling efficient bitrate control and speedup on CPUs. FIG. 7A illustrates a baseline autoencoder pipeline. In this example, each component is implemented as an ANN, resulting in very slow performance on a CPU.

Figure 7B:
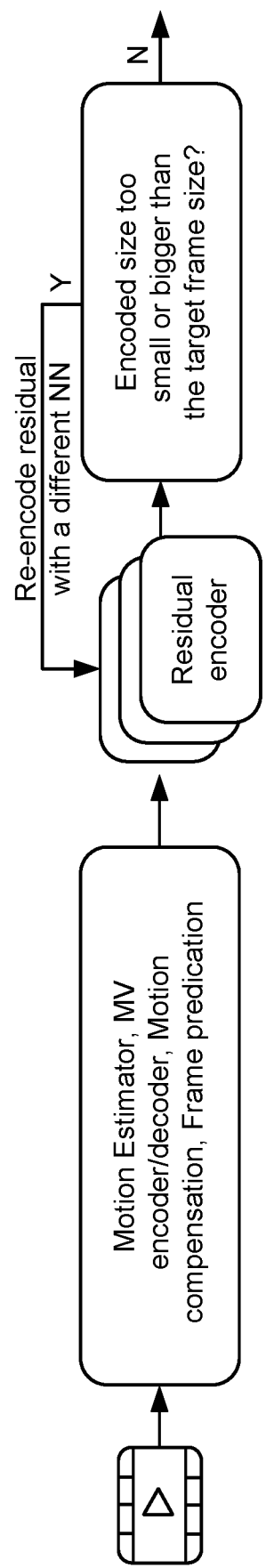

In general, any video encoder must encode a frame at a size barely below the target frame size. This can be done either by a heuristic to predict which quality level can yield the right frame size encoding or encoding the frame multiple times at different quality levels. In various embodiments, the former approach is adopted as illustrated in FIG. 7B, while avoiding performing the entire encoding process on a given frame multiple times. Multiple autoencoders are trained, each with a different α value (for example, using the expectation function of Equation 1) to achieve different quality/size tradeoffs. In some embodiments, while training these autoencoders, only the residual encoders and decoders are changed, while freezing the weights of the motion vector (MV) encoder decoder ANNs. As a result, once a frame is encoded, the motion vectors and residual can be reused while only re-encoding the residual using a higher quality encoder. This allows efficient encoding of a frame multiple times (with the residual encoder of different αs). When deployed, if a given frame size is too large or too small, only the residual need be re-encoded.

Figure 7C:
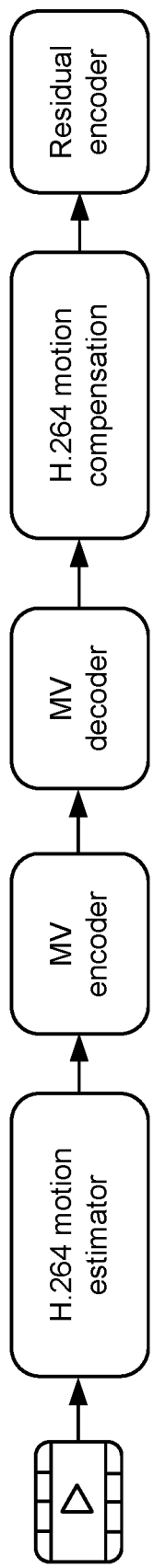

In some embodiments, a CPU-optimized encoding pipeline is employed, as illustrated in FIG. 7C. This approach differs from a GPU-based autoencoder in two key aspects: (1) it re-uses the motion prediction logic in H.264 to generate motion vectors, and (2) the frame prediction NN is removed from the motion compensation step. In an exemplary embodiment using 32 threads, this process takes 35 ms to encode a 720p HD frame (and 17.2 ms on 480p). This results in the slightly lower compression efficiency, but it still achieves most of the benefit of a data-scalable coding system (e.g., low frame delay in presence of packet loss).

In some embodiments, an autoencoder is implemented using Pytorch's just-in-time compiler to optimize the implementation. In some embodiments, the float-point precision is reduced from 32-bit to 16-bit for all the neural network layers. These optimizations when deployed on a NVIDIA A100 GPU lead to a speed-up in encoding from 19.8 fps on 720p HD (and 39.5 fps on 480p) videos by the off-the-shelf implementation to 28.6 fps (and 54.9 fps). This speed is on par with alternative state-of-the-art autoencoders, and it still achieves desirable loss resilience and compression efficiency.

The techniques described herein are complementary to existing congestion control (CC) algorithms. When combined with these techniques, the CC algorithm does not need to retransmit packets, except when no packets of a frame are received. The CC determines how fast the packets should be sent out and the target bitrate (size) of the next frame, while these techniques determine what should be in each packet.

Figure 8:
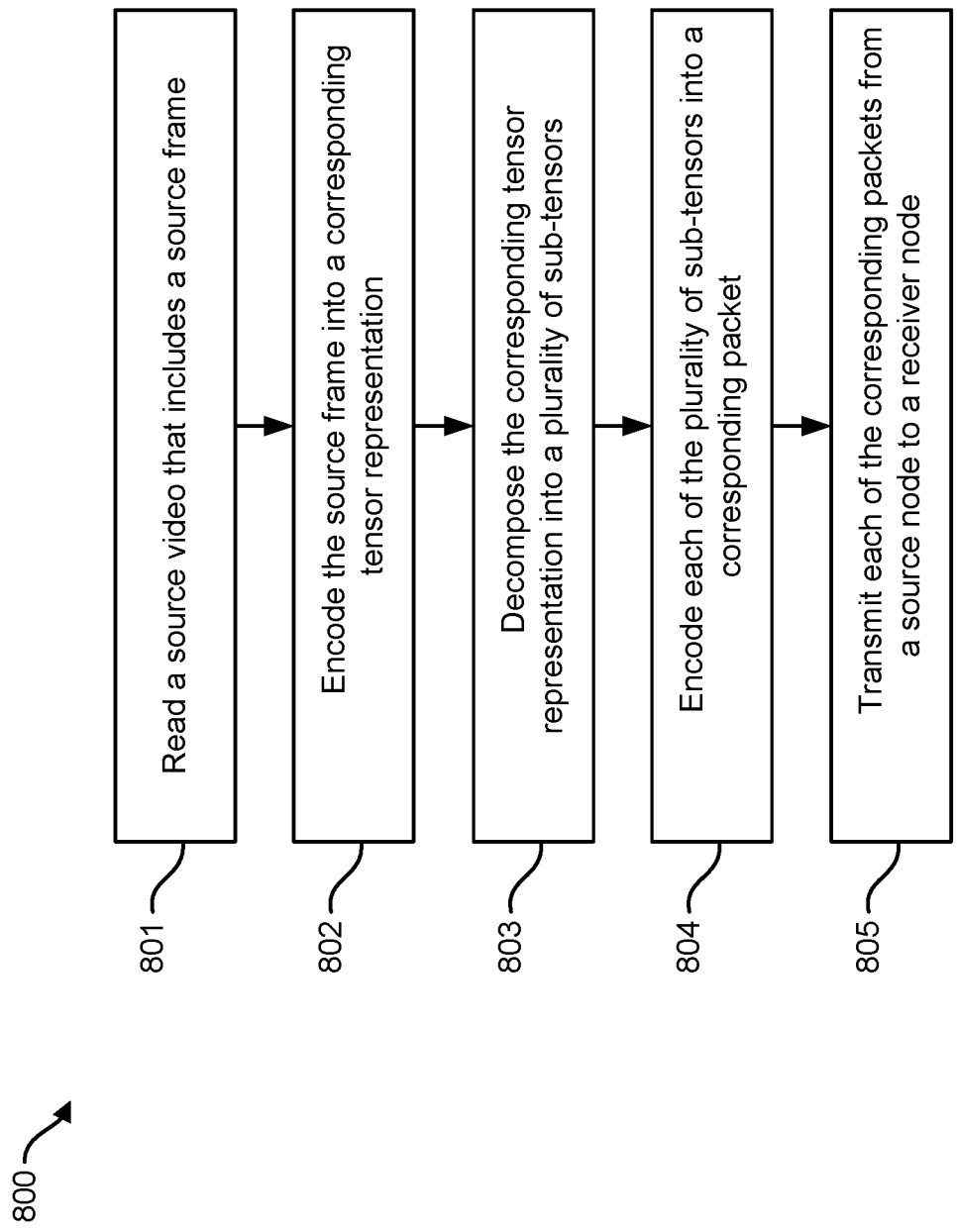
FIG. 8 is a flow diagram illustrating a method of streaming video over a network according to embodiments of the present disclosure.

FIG. 8 is a flow diagram of an example process 800 for streaming video over a network. Operations of the process 800 can be implemented, for example, by the components of the environment 300 that includes the sender 305 and the receiver 310. The sender 305 reads a source video that includes at least a source frame (801). For example, a video stream consists of multiple groups of consecutive frames starting with an I-frame followed by P-frames and B-frames. The sender 305 encodes the source frame into a corresponding tensor representation using a machine learning model (802). For example, the residual generated by the sender 305 is encoded by the residual encoder 317 and combined with encoded motion vectors to form a coded tensor 319. The corresponding tensor representation is decomposed into a plurality of sub-tensors (803). For example, the entropy encoder and packetizer 320 splits the coded tensor 319 into sub-tensors. Each of the plurality of sub-tensors is encoded into a corresponding packet (804). For example, the entropy encoder and packetizer 320 encodes each of the sub-tensors into a respective entropy encoded format and a data packet is generated for each entropy encoded sub-tensors. The data packets are transmitted from a source node to a receiver node (805). For example, the data packets are transmitted from the sender 305 to the receiver 310 over the network 302.

Figure 9:
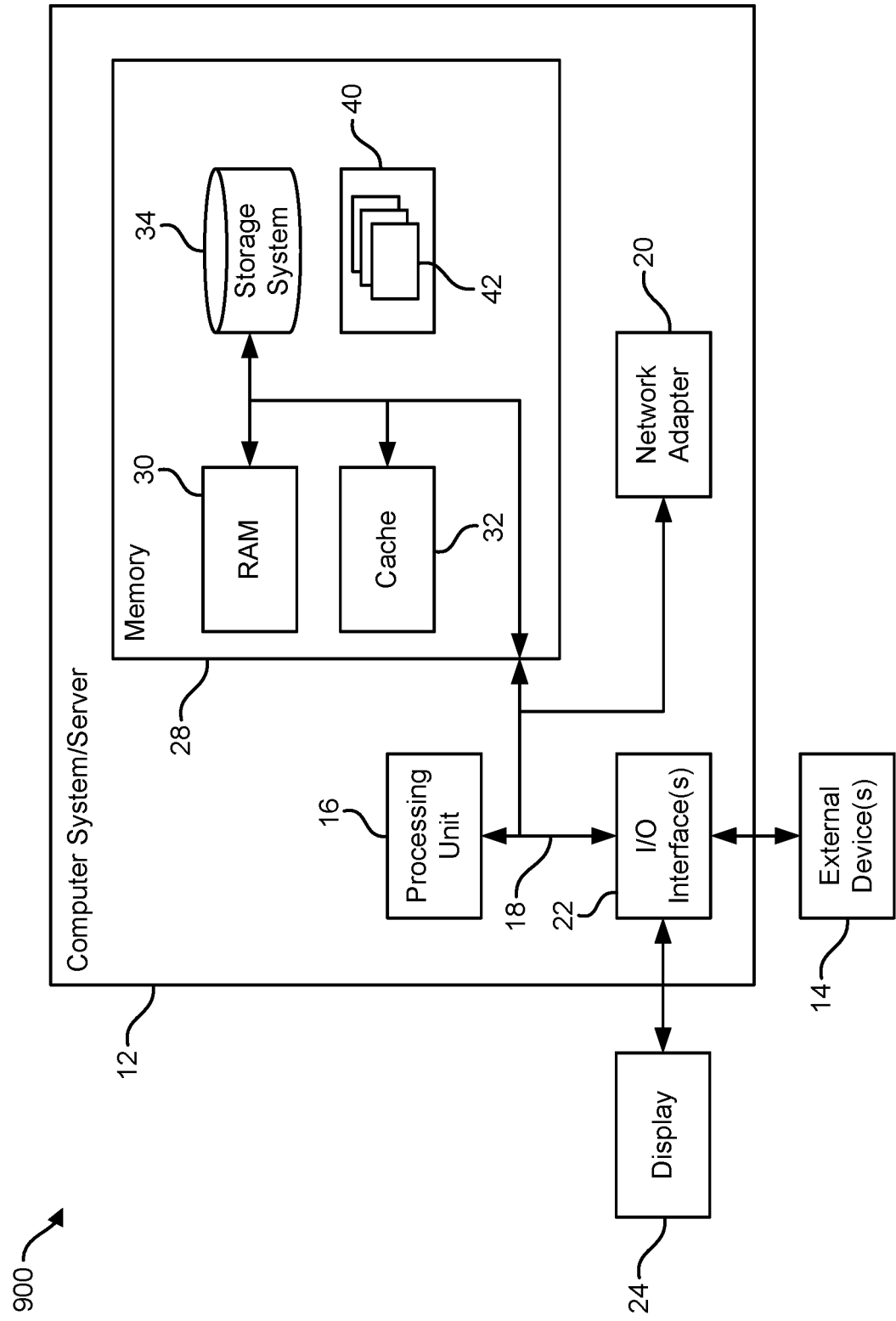
FIG. 9 depicts a computing node according to embodiments of the present disclosure.

FIG. 9 is a schematic of an example of a computing node. Computing node 900 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of streaming video over a network, the method comprising:
   reading a source video, the source video comprising at least a source frame;
   encoding the source frame into a corresponding tensor representation by a machine learning model;
   decomposing the corresponding tensor representation into a plurality of sub-tensors;
   encoding each of the plurality of sub-tensors into a corresponding packet;
   transmitting each of the corresponding packets via a network from a source node to a receiver node.

2. The method of claim 1, wherein encoding the source frame comprises determining an I-frame corresponding to the source frame.

3. The method of claim 1, wherein encoding the source frame comprises determining a P-frame corresponding to the source frame.

4. The method of claim 1, wherein encoding the source frame comprises determining a composite frame comprising at least two regions, the first region encoded as a P-frame and the second region encoded as an I-frame.

5. The method of claim 4, further comprising:
   encoding a second source frame by determining a composite frame comprising a third region, different than the second region, the third region being encoded as an I-frame.

6. The method of claim 1, wherein the machine learning model comprises an artificial neural network.

7. The method of claim 6, wherein encoding each of the plurality of source frames into its corresponding tensor representation comprises applying an autoencoder.

8. The method of claim 1, wherein decomposing the tensor representation comprises randomly selecting the plurality of sub-tensors.

9. The method of claim 1 wherein encoding each of the plurality of sub-tensors comprises applying entropy encoding.

10. The method of claim 1, further comprising:
    receiving at least some of the packets via the network at the receiver node;
    decoding the received packets, thereby obtaining at least some of the plurality of sub-tensors;
    combining the at least some of the plurality of sub-tensors to form a playback tensor;
    decoding the playback tensor to determine a playback frame.

11. The method of claim 10, wherein decoding the received packets comprises applying entropy encoding.

12. The method of claim 10, wherein decoding the playback tensor comprises applying an artificial neural network.

13. The method of claim 12, wherein decoding the playback tensor comprises applying an autoencoder.

14. The method of claim 10, wherein the playback frame comprises a P-frame, an I-frame, or a composite thereof.

15. The method of claim 10, wherein at least one of the plurality of sub-tensors is not obtained, and wherein the playback tensor comprises zero-values in place of the at least one of the plurality of sub-tensors not obtained.

16. The method of claim 10, wherein at least one of the plurality of sub-tensors is not obtained, the method further comprising:
    sending from the receiver node to the source node an indication of the at least one of the plurality of sub-tensors not obtained;
    in response to said indication, determining the playback frame at the source node;
    determining a resynchronized frame configured to correct the omission of the at least one of the plurality of sub-tensors not obtained;
    transmitting the resynchronized frame from the source node to the receiver node.

17. A method of playing streaming video, the method comprising:
    receiving a plurality of packets via a network from a source node, each of the plurality of packets comprising an encoded sub-tensor of a tensor;
    decoding each of the plurality of packets, thereby obtaining a plurality of sub-tensors of the tensor;
    combining the plurality of sub-tensors to form a playback tensor;
    decoding the playback tensor to determine a playback frame.

18. A computer program product for streaming video over a network, the computer program product comprising a computer readable storage medium having program instructions embodied therewith, the program instructions executable by a processor to cause the processor to perform a method, the method comprising:
    reading a source video, the source video comprising at least a source frame;
    encoding the source frame into a corresponding tensor representation by a machine learning model;
    decomposing the corresponding tensor representation into a plurality of sub-tensors;

encoding each of the plurality of sub-tensors into a corresponding packet; and transmitting each of the corresponding packets via a network from a source node to a receiver node.

19. A computer program product for playing streaming video, the computer program product comprising a computer readable storage medium having program instructions embodied therewith, the program instructions executable by a processor to cause the processor to perform a method, the method comprising:

receiving a plurality of packets via a network from a source node, each of the plurality of packets comprising an encoded sub-tensor of a tensor;

decoding each of the plurality of packets, thereby obtaining a plurality of sub-tensors of the tensor;

combining the plurality of sub-tensors to form a playback tensor; and decoding the playback tensor to determine a playback frame.

20. A system comprising:

a source node configured to read a source video, the source video comprising at least a source frame, encode the source frame into a corresponding tensor representation by a machine learning model, decompose the corresponding tensor representation into a plurality of sub-tensors, encode each of the plurality of sub-tensors into a corresponding packet, transmit each of the corresponding packets via a network to the receiver node; and a receiver node configured to receive at least some of the packets via the network, decode the received packets, thereby obtaining at least some of the plurality of sub-tensors, combine the at least some of the plurality of sub-tensors to form a playback tensor, decode the playback tensor to determine a playback frame.

\* \* \* \* \*